United States Patent
Rigney et al.

(10) Patent No.: US 11,989,175 B2
(45) Date of Patent: May 21, 2024

(54) SYSTEMS AND METHODS FOR CUSTOMIZING ELECTRONIC INFORMATION CARDS WITH CONTEXT DATA

(71) Applicant: MicroStrategy Incorporated, Tysons Corner, VA (US)

(72) Inventors: Scott Rigney, Bristow, VA (US); Michael-Andrew Keays, Annandale, VA (US); Malik Abu-Kalokoh, Fort Washington, MD (US); Utkarsha Bhave, Tysons Corner, VA (US)

(73) Assignee: MICROSTRATEGY INCORPORATED, Tysons Corner, VA (US)

(*) Notice: Subject to any disclaimer, the term of this patent is extended or adjusted under 35 U.S.C. 154(b) by 0 days.

(21) Appl. No.: 17/935,201

(22) Filed: Sep. 26, 2022

(65) Prior Publication Data

US 2023/0008424 A1    Jan. 12, 2023

Related U.S. Application Data

(63) Continuation of application No. 17/172,767, filed on Feb. 10, 2021, now Pat. No. 11,494,372.

(60) Provisional application No. 62/972,713, filed on Feb. 11, 2020.

(51) Int. Cl.
*G06F 16/242* (2019.01)
*G06N 20/00* (2019.01)

(52) U.S. Cl.
CPC ......... *G06F 16/2423* (2019.01); *G06N 20/00* (2019.01)

(58) Field of Classification Search
CPC .............................. G06F 16/2423; G06N 20/00
USPC ......................................................... 707/769
See application file for complete search history.

(56) References Cited

U.S. PATENT DOCUMENTS

| | | | |
|---|---|---|---|
| 2004/0230447 A1* | 11/2004 | Schwerin-Wenzel | ........................ G06Q 10/10 705/300 |
| 2004/0249659 A1* | 12/2004 | Schwerin-Wenzel | ........................ G06Q 10/0635 705/7.36 |
| 2016/0044132 A1* | 2/2016 | Croft | ....................... H04L 67/02 709/225 |
| 2021/0383590 A1* | 12/2021 | Roimela | .............. H04N 19/597 |

* cited by examiner

*Primary Examiner* — Joshua Bullock
(74) *Attorney, Agent, or Firm* — Bookoff McAndrews, PLLC

(57) ABSTRACT

Methods, systems, and apparatus, including computer programs stored on computer-readable media, for generating context data for an information card are disclosed. Upon receiving a selection of a data element to include in an information card, a plurality of dimensional view types available for the data element are determined and provided to a user. Upon receiving a selection of a dimensional view type from the plurality of dimensional view types, a set of attributes associated with the dimensional view type are determined and provided to the user. A selection of an attribute from the set of attributes is received, and a dimensional view is generated based on the selection of the dimensional view type and attribute.

20 Claims, 11 Drawing Sheets

SYSTEMS AND METHODS FOR CUSTOMIZING ELECTRONIC INFORMATION CARDS WITH CONTEXT DATA

RELATED APPLICATION(S)

This application is a continuation of and claims the benefit of U.S. application Ser. No. 17/172,767, filed Feb. 10, 2021, which claims priority to U.S. Provisional Application No. 62/972,713, filed Feb. 11, 2020, each of which are incorporated herein by reference in their entireties.

TECHNICAL FIELD

The present disclosure relates generally to customizing electronic information presented to a user and, more particularly, to enriching information content with context data and presenting the enriched content in a convenient and user-friendly manner.

BACKGROUND

Databases often include information about many topics. Users often retrieve content by issuing a query, for example, using natural language or using a structure query language (SQL). As data retrieval techniques rapidly advance, data customization and presentation have also become a vital part of data analytics.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer-implemented method of generating context data for an information card may comprise: receiving a selection of a data element to include in an information card; determining a plurality of dimensional view types available for the data element; providing the plurality of dimensional view types; receiving a selection of a first dimensional view type from the plurality of dimensional view types; determining a first set of attributes associated with the first dimensional view type; providing the first set of attributes; receiving a selection of a first attribute from the first set of attributes; and generating a first dimensional view based on the selection of the first dimensional view type and first attribute.

In one embodiment, a system may comprise: one or more processors; and one or more computer-readable media comprising instructions that, when executed by the one or more processors, cause the one or more processors to perform operations for generating context data for an information card. The operations may comprise: receiving a selection of a data element to include in an information card; determining a plurality of dimensional view types available for the data element; providing the plurality of dimensional view types; receiving a selection of a first dimensional view type from the plurality of dimensional view types; determining a first set of attributes associated with the first dimensional view type; providing the first set of attributes; receiving a selection of a first attribute from the first set of attributes; and generating a first dimensional view based on the selection of the first dimensional view type and first attribute.

In one embodiment, one or more non-transitory computer-readable media may store instructions that, when executed by one or more processors, cause the one or more processors to perform operations for generating context data for an information card. The operations may comprise: receiving a selection of a data element to include in an information card; determining a plurality of dimensional view types available for the data element; providing the plurality of dimensional view types; receiving a selection of a first dimensional view type from the plurality of dimensional view types; determining a first set of attributes associated with the first dimensional view type; providing the first set of attributes; receiving a selection of a first attribute from the first set of attributes; and generating a first dimensional view based on the selection of the first dimensional view type and first attribute.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1A:
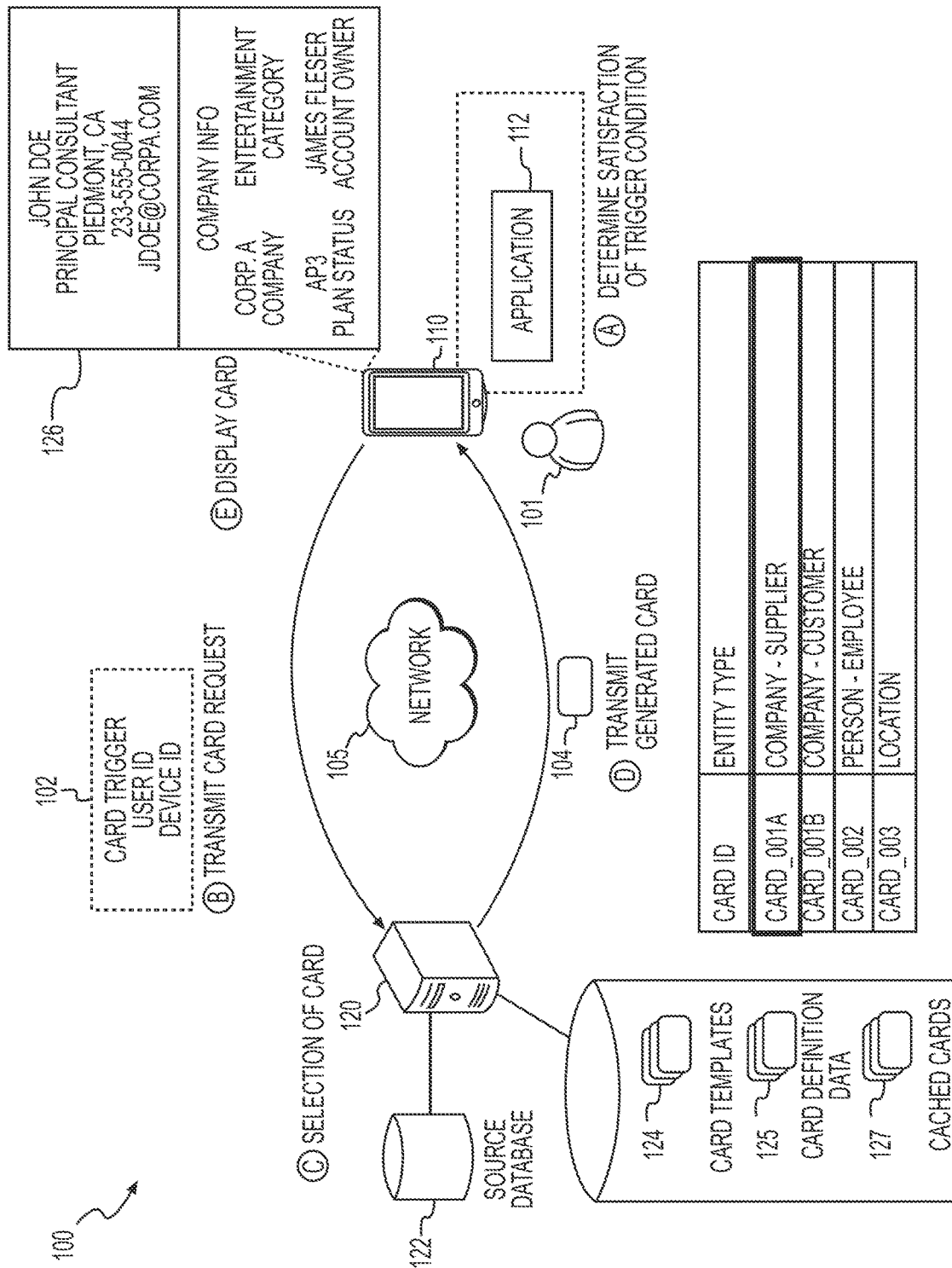
FIG. 1A shows a diagram of an exemplary system capable of generating and presenting customized information cards.

The following embodiments describe systems and methods for customizing electronic information presented to a user and, more particularly, for enriching information content with context data and presenting the enriched content in a convenient and user-friendly manner.

In the present disclosure, a computing system may facilitate generation and publication of customized information cards that can be tailored for specific organizations and users. The system may provide an interface for an administrator to select specific data sources and define a card format that draws specific types of information from those data sources. The system may also provide functionality for an administrator to associate specific card formats with specific entities and keywords, such that references to those entities and keywords trigger access to or display of the information cards. An administrator may configure an information card to present a customized set of information, such as a customized subset of attributes and metrics for an entity. The information presented in the card may be drawn from a customized data source and may have a customized format.

Even when an information card has been customized in the aforementioned manner, data elements such as attributes or metrics included in the card might be shown as mere data points. For example, a metric such as a company's revenue in the last 4 quarters may be displayed with a corresponding value (e.g., $1,000,000 USD). When a metric is displayed merely with a corresponding value or a data point, it may be difficult for a user to understand the significance or relevance of the displayed metric in the user's decision-making process. In other words, when a metric is presented without any context, the user may be forced to request more information by making additional user inputs to retrieve desired data.

The techniques discussed in the present disclosure address these challenges by further customizing the information cards to include context data in connection with displayed data elements (e.g., attributes, metrics, etc.). In one embodiment, upon an administrator selecting data elements to include in an information card, the administrator may be given an option to select one or more dimensional views to be displayed with each data element. For each selected dimensional view, the administrator may be further given an option to select an attribute from among multiple attributes associated with the selected dimensional view. The selected attribute may be used to generate the dimensional view including information that supplements the corresponding data element. When presented to a user, the dimensional view(s) may provide contextual information that might be helpful in understanding the significance or relevance of the corresponding data element. Each dimensional view may comprise one or more graphical user interface elements that aid the user in understanding the context data quickly and seamlessly. Providing one or more dimensional view(s) may reduce the amount of system resources used by a given user based on the user having to submit multiple queries to obtain the same amount of information (e.g., query response plus contextual data) rather than the multiple dimensions provided from a single query, as disclosed herein.

The administrator may associate multiple dimensional views with a single data element (i.e., one data element). In this case, the administrator may be further given an option to select how the multiple dimensional views are displayed in or near the corresponding data element. The options for displaying dimensional views associated with a single data element may include a time-based scrolling (e.g., automated or semi-automated scrolling) and manual scrolling. For example, the dimensional views may be displayed sequentially one after another if an automated scrolling feature is selected by the administrator. When the administrator selects a manual scrolling feature, a user viewing the information card may be allowed to select a dimensional view to be displayed among multiple dimensional views. When the administrator selects a semi-automated scrolling feature, the user may be allowed to transition between the automated-scrolling mode and the manual scrolling mode.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1A is a diagram of an exemplary system capable of generating and presenting customized information cards. The system 100 may include a client device 110, a server 120, and a network 105. The server 120 may have access to a source database 122 for an entity such as, for example, an organization or a company. The server 120 may be implemented using a single computer, or multiple computers that cooperate to perform the functions discussed below, and which may be located remotely from each other.

The client device 110 may include an application 112 that enables the client device 110 to dynamically generate and display information cards in response to certain actions being performed on the client device 110 or certain conditions of the client device 110 being detected. As discussed below, the application 112 may allow the client device 110 to obtain and provide information from the source database 122 through information cards that can be dynamically adjusted based on the actions or conditions detected on the client device 110. In some embodiments, the application 112 may run in the background, out of view of the user, and monitor conditions of the client device 110 on an ongoing basis. The application 112 may interact with an operating system of the client device 110, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, and so on.

The client device 110 may be associated with a user 101. When the application 112 is installed on the client device 110, a user identifier for the user 101 may be determined by the application 112. For example, the user 101 may log in using one or more credentials. The application 112 may then customize various aspects of the system for the user 101, including the trigger conditions used to detect an appropriate context for providing an information card as well as the type of content included in information cards.

For example, the user 101 may be a member of an organization, e.g., an employee of a company. The source database 122 may represent database records stored by or for the organization. The records may not be publicly available and are subject to data access restrictions, such as requirements that users be issued credentials from the organization that grant authorization to access the records. Different users may be granted different levels of authorization, and the server 120 may enforce access restrictions so that each user may be only allowed to access the subsets of information the user is authorized to access.

The system 100 may improve techniques used to provide users with access to information in a more convenient and contextually relevant manner. Information is presented through information cards that are displayed at specified points in time based on the satisfaction of context-based trigger conditions, which represent the relevance of specific topics or keywords to the activities of the client device 110. In this manner, the system 100 may improve the relevance of information that is displayed to a user based on actions performed on the client device 110 and may ensure that the displayed information is likely of interest to the user at the time the information is displayed. Unlike many other systems, the user 101 may not need to manually submit a query or select from a list to obtain the information. Instead, the application 112 may initiate display of the information as it detects that the information corresponds to the current context of the client device 110.

In FIG. 1A, information cards are presented on the client device 110 as cards that include information obtained from the source database 122. The cards may include dynamically generated information so that they reflect changes or updates to data stored in the source database 122. For example, the server 120 may store card templates 124 that identify, for example, the content, format, and structure of the cards. The specific information that is displayed in the cards may be dynamically populated into the templates at the time the cards are determined to be relevant (e.g., upon detecting a context-based trigger condition), so that each display of a card includes information generated from up-to-date information from the source database 122. Thus, if the same card for the same entity is displayed at different times, the content may be different for each instance of the card as the information in the source database 122 changes.

The card templates 124 may include different templates for different types of entities. For example, one template may be used for a person, another template may be used for a company, another template may be used for a location (e.g., a particular store or region), and so on. Different card templates 124 may also be defined and used for entities having different semantic relationships with the user 101, the user's organization, or others. For example, a first template may be used for companies that are suppliers and may specify a first set of statistical measures to display in a card. A second template for customers may specify a different set of statistical measures to display in a card.

The system 100 may also store card-specific information in card definition data 125 that specifies the parameters of individual cards. The card templates 124 may each represent characteristics of cards for a particular type of entity or class of entities, and the card definition data 125 may specify the particular card parameters for specific entities. Although cards for different entities of the same type may use the same card template 124, each individual card may have specific information that affects its content and presentation. For example, a card definition for a specific entity may include, e.g., an entity identifier, an identifier of the card template to be used for the entity, an indication of the keywords to be used to trigger presentation of the card for the entity, a mapping of data source elements to the components of the card template (if not already specified in the card templates 124), and so on. For example, a card definition for a company "Example Co." may specify that the "CARD_001A" template should be used, and that the specific set of keywords that trigger display of that company's card are "Example Co.," "Example," and "EC." The card definition data 125 may include a card definition record for each information card made available in the system 100. The card definition data 125 may also be used to customize (e.g., alter or override) aspects of the card templates.

In FIG. 1A, the application 112 on the client device 110 may detect a context-based trigger condition, such as a keyword representing an entity having corresponding information in the database 122. The application 112 may cause the client device 110 to request an information card, and the server 120 may determine an appropriate information card template and/or card definition data, generate the information card, and send data for the card back to the client device 110 for display. This process is explained in further detail below with respect to various stages labelled (A) through (E).

In stage (A), the application 112 may monitor activity on the client device 110 to detect satisfaction of a trigger condition that specifies display of an information card on the client device 110. Trigger conditions may represent activity on the client device 110 indicating that the user 101 is likely to view or hear information.

The trigger conditions may be monitored passively without requiring the user 101 to provide input on the client device 110. For example, detection of an entity term in the text corresponding to an upcoming calendar appointment through a calendar application of the client device 110 may represent satisfaction of a trigger condition indicating that a user is likely to view information associated with the entity. In this case, the client device 110 may monitor calendar data of the calendar application without the user 101 actively requesting the information, which reduces the number of user inputs required to display contextually-relevant information (i.e., information for an entity that is a participant to the calendar appointment).

In another example, the trigger condition may represent a location of the client device 110 being detected within threshold proximity (e.g., within 100 meters) of a conference center that is associated with information cards. In this example, the application 112 may determine that the user 101 is likely to view conference information based on the location of the client device 110 and thereby determine that a trigger condition has been satisfied.

In some instances, a trigger condition may represent an action performed by the user 101 on the client device 110 that relates to a particular entity or topic. For example, detection of a message that includes a term corresponding to an entity may represent satisfaction of a trigger condition for displaying information of the entity. In some other examples, a trigger condition may represent a search query received for an entity term, or some action performed on the client device 110 that indicates that the user 101 is requesting information such as, e.g., performing a web search through a browser application, performing a search using capabilities of the operating system (e.g., for an application, a file, etc.), among others.

In stage (B), the client device 110 may transmit a card request 102 to the server 120. The card request 102 may include the term(s) identified as corresponding to an entity, or an indication of the entity determined to be relevant to the current context. Accordingly, the card request 102 may include monitored data collected at the client device 110, such as data indicating the trigger condition that was determined to be satisfied by the application 112. The card request 102 may also include an identifier for the user 101 and/or the client device 110. The identifiers may be used to customize the information that is displayed on the client device 110. For example, the organization managing the source database 122 may specify different levels of access to the source database 122 based on a user classification specified by a user or device identifier. In this manner, the system 100 may generate and display different information cards for users of different access levels, even in response to satisfaction of the same trigger condition.

In stage (C), upon receiving the card request 102, the server 120 may access the source database 122 and generate one or more information cards that are provided to the client device 110 in response to the card request 102. The server 120 may generate information cards that are relevant to entity terms corresponding to the trigger condition detected in stage (A). For example, the server 120 may generate cards that include information for an entity that was identified in text displayed at the client device 110, such as a calendar appointment, a text message, a search interface, an email, etc. Such text may be found in a user interface of the operating system or an application different from the application 112. In some situations, the reference to the entity may be detected by the client device 110 in data that is not part of a user interface, such as the content of a notification, message, or record accessed by the client device 110. The selected information card(s) may include information corresponding to the entity in the source database 122.

Generating an information card may include determining that a keyword matching a particular information card definition record has been found. The matching card definition in the card definition data 125 may specify an entity identifier for a particular entity, a card template 124 for generating the card, and locations of information about the particular entity in an appropriate data source. The server 120 may then generate the card using the layout and content types specified by the appropriate card template 124, with values being populated from the data sources. For example, the attributes and/or metrics specified for fields or regions of a card template 124 may be populated with values for the particular entity as determined from the source database 122.

Information cards may be generated on-demand, in response to card requests as noted above. In addition or as an alternative, information cards may be generated predictively, in advance of requests for the cards, and then cached. The cached cards may be refreshed periodically, e.g., after a certain time has elapsed or if the underlying data affecting the content of a card has changed. As a result, cached cards 127 may be made available with very low latency. A machine learning model may receive, as inputs, one or more data points (e.g., past queries, location information, calendar information, etc.), to output an information card prediction. The machine learning model may be trained on previous data such as previous searches (e.g., supervised training) or on unsupervised data (e.g., data without a known result).

In stage (D), the server 120 may transmit an information card 104 for presentation on the client device 110. In stage (E), upon receiving the information card 104 from the server 120, the client device 110 may display the information card 104 on a user interface 126. The information card 104 may be presented in or with the current user interface of the client device 110, which may be outside the application 112. For example, the information card 104 may be provided through the operating system (OS) functionality of the client device 110 outside of the application 112, e.g., as an OS notification. In general, the information card 104 may be displayed in, alongside, or on (e.g., as an overlay to) the application or interface that has the term(s) that triggered the presentation of the information card 104, such as the current interface of the client device 110, whether the current application or interface is one for messaging, search, calendar management, and so on, or even a lock screen or home screen showing general system notifications. In some instances, the information card 104 may be presented through the application 112, e.g., as an application message, or a data object presented on a user interface of the application 112. The information card 104 may also be displayed in different formats, such as an image, an interactive control configured to initiate display of the information, e.g., a button that displays the information in response to receiving a user input, and so on.

In FIG. 1A, the application 112 may detect an upcoming calendar event for an upcoming meeting with an employee of the entity "Corporation A." The application 112 may determine that a calendar event trigger condition has been satisfied based on processing calendar data of the client device 110 and determine that text corresponding to the calendar event references the entity. The server 120 may receive the card request 102 from the client device 110, select a card template, and specify the generation of an information card 104 for a supplier "JOHN DOE" identified in the calendar appointment. The server 120 may obtain information associated with "JOHN DOE" from the source database 122 in order to populate a card template with information about the particular entity that is relevant to the user 101.

As shown in FIG. 1A, the information card 104 displayed on the user interface 126 may include information for "JOHN DOE," an employee of a supplier company for the company of the user 101. The server 120 may retrieve information for this employee from the source database 122 since the calendar appointment detected by the application 112 identifies "JOHN DOE" in the text of the calendar appointment. In this example, the system 100 may thus process calendar data to determine that the user 101 has an upcoming meeting with "JOHN DOE" and may determine the user 101 would benefit from receiving employee information prior to or during the meeting.

In some embodiments, the system 100 may be capable of outputting information cards or data associated with information cards while a user 101 accesses various applications running on the client device 110. In such embodiments, the application 112 may run as a background process and monitor user activity on other applications to detect the satisfaction of trigger conditions. For example, if a user 101 highlights or selects text that is displayed through a web browser application on the client device 110, the application 112 may detect that a trigger condition has been satisfied and the highlighted or selected text may be used as entity terms to identify and output information cards corresponding to the highlighted or selected text. In other embodiments, the application 112 may detect that certain text displayed on the user interface of the client device 110 match one or more keywords associated with the card templates 124 or card definition data 125, without the user 101 highlighting or selecting the text as being relevant. Such automatic detection without any user input may also satisfy a trigger condition that leads to selection and generation of information card(s).

Figure 1B:
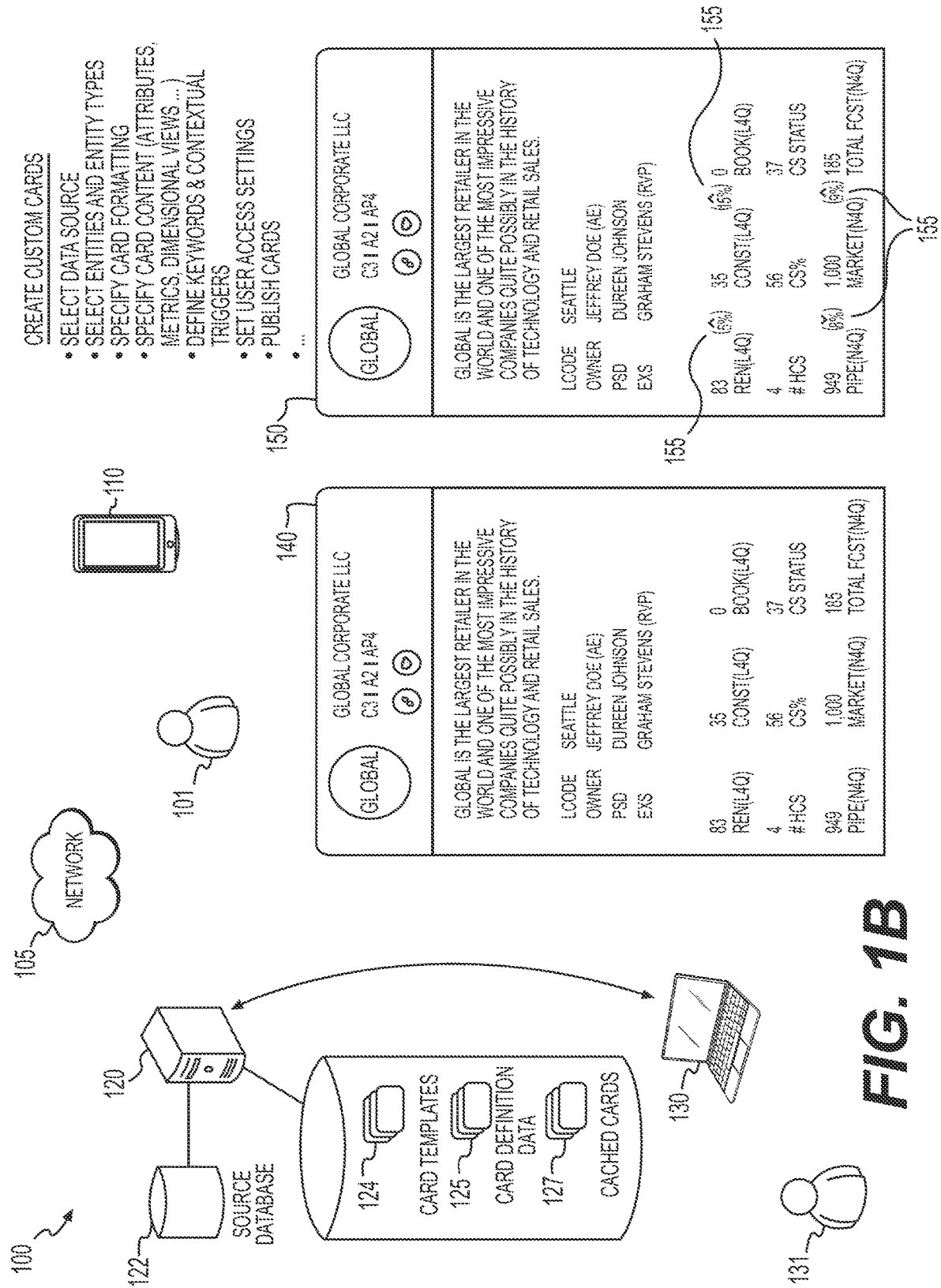
FIG. 1B shows a diagram depicting creation and management of information cards by an administrator or a card author, according to one aspect of the present disclosure.

FIG. 1B shows a diagram depicting creation and management of information cards by an administrator or a card author, according to one aspect of the present disclosure. The system 100 may enable an administrator 131 (or card author 131, used interchangeably herein) to create and manage information cards using an administrator client device 130. The client device 130 may interact with the server 120 to provide card creation user interfaces for the administrator 131 to design, manage, and publish information cards for an enterprise or other organization. The administrator 131 may access a card creation user interface using the client device 130. The card creation user interface may be provided by a webpage, a web application, a native application running on the client device 130, or other software.

From the card creation user interface, the administrator 131 may create custom cards and specify both the content and behavior of the cards. For example, the administrator 131 may select a data source, which may be a specific data set or combination of data sets. From the information in the selected data source, the administrator 131 may specify entities and entity types for which cards should be created. The card creation user interface may present indications of entities referenced in the data source, e.g., people, places, companies, and other entities. The administrator 131 may select a specific entity or an entity type to create a card for that entity or entity type.

The card creation user interface may include controls that allow the administrator 131 to specify the layout and formatting for the card. This may include selecting a template that has regions or fields (i.e., grids) where data source elements may be inserted. To specify the content of the card, the administrator 131 may select attributes, metrics, or other information derived from the data set to insert into the regions or fields of the card being generated. For example, if the administrator 131 has selected a particular company as the entity for the card, the card creation user interface may present a list of data elements that are available based on the content of the data set, e.g., a location for the company, the number of employees of the company, revenue of the company, industry for the company, and so on. These data elements may be specified directly in the data set, as a field or value of the data set, or may be derived from the data set using functions, equations, or other processing. In other words, each data element may be an attribute, a metric, or other information pertinent to the selected entity, as defined by the administrator 131 via the card creation user interface.

When presented to the user 101, the data elements such as attributes or metrics included in information cards may be shown as data points. Information card 140 is an example information card showing metrics as data points. It may be difficult for a user to understand the significance or relevance of a displayed metric when the metric is presented without any context, requiring the user 101 to request more information by making additional user inputs to retrieve desired data. Such additional requests may also require additional resources for a longer period of time. To alleviate this problem and allow deeper understanding of the displayed metric, the information cards may be further customized by the administrator 131 to include context data. To that end, in one embodiment, upon the administrator 131 selecting data elements to include in the respective fields or regions of an information card, the administrator 131 may be given an option to select one or more dimensional views to be displayed with each data element. In some embodiments, artificial intelligence (AI) techniques such as machine learning algorithms may be used to determine one or more dimensional views to present to the administrator 131 for selection. When presented to the user 101, the dimensional view(s) may provide contextual information that might be helpful in understanding the significance or relevance of the corresponding data element. The information card 150 is an example information card providing dimensional views in connection with the displayed metrics. In the present disclosure, an information card containing dimensional view(s), such as the information card 150, will be referred to as an enhanced information card. The enhanced information card 150 may include dimensional view(s) 155 that were selected by the administrator 131 for inclusion in the information card via the card creation user interface.

There may be multiple types of dimensional views that the administrator 131 may choose from via the card creation user interface. One of those dimensional view types is shown in the enhanced information card 150. The dimensional view(s) 155 is of a "percent change" dimensional view type, which represents how much the metric has changed from a predefined time or time period. For each type of dimensional view selected by the administrator 131, the administrator 131 may be further given an option to select one or more attributes that are necessary for building the dimensional view. For example, if the administrator 131 selects the percent change dimensional view type, the card creation user interface may further provide an option for the administrator 131 to select a time or time period to which the current metric may be compared. In some embodiments, AI techniques such as machine learning algorithms may be used to determine attributes that are related to a selected dimensional view type and may be recommended to the administrator 131 for selection. The creation and presentation of dimensional views based on corresponding attributes will be explained in greater detail below.

In general, information cards may include a variety of interactive elements, including buttons, hyperlinks, sliders or filters, and so on that may enable a user 101 to take an action, within the interface of the card or outside. For example, controls in a card may be selected to open documents, applications, or modules, or to initiate communication by starting a call or sending a message.

The card creation user interface may enable the administrator 131 to specify aspects of the behavior of the card being created. This includes setting keywords that, when present in the context of the user's device, trigger presentation of the card. These keywords may include a name for the entity described by the card, nicknames and variations (such as abbreviations, acronyms, miss-spellings and so on), terms related to the content of the card, terms frequently used with references to the entity in other documents or in queries, etc. The server 120 may recommend keywords based on text that is associated with the entity in the data set used to generate the card. The card creation user interface may also enable the administrator 131 to specify contextual factors that may trigger presentation of the card. These may include locations, times, the presence of devices or users nearby, and so on.

Once the card and its desired behavior are specified, the server 120 may save records of the cards, for example as card definition data 125 and/or card templates 124. The card creation user interface may enable the administrator 131 to publish the cards, making them available to other users and devices.

In some embodiments, the server 120 may represent multiple servers that cooperate to generate and provide information cards. For example, completed cards may be published to a representational state transfer (REST) server. This server may make additions, get attributes, filter by attributes, generate HTML, and perform other functions. After being processed by the REST server, card data, reports, and underlying data sets (e.g., data cubes) may be cached in an intelligence server, which has the metadata for all of the cards that have been published. Later, when client devices retrieve cards, the intelligence server may provide a cached copy. In addition, client devices may predictively fetch and cache cards based on prior usage patterns and/or analysis of a user's current tasks or data. These steps may significantly reduce the latency of the system 100 in being able to detect the applicability of a card and present the card to a user 101.

Figure 2:
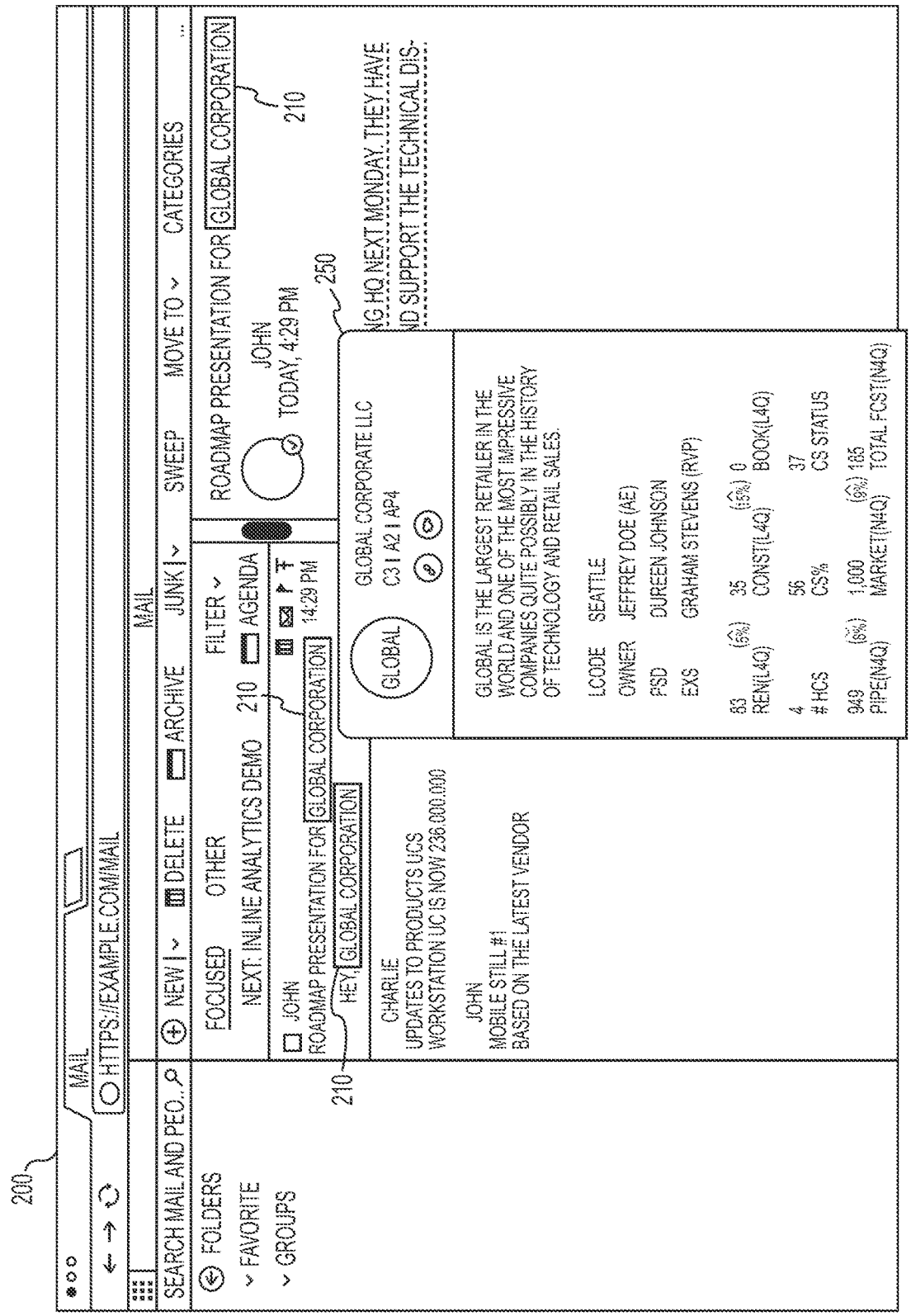
FIG. 2 shows an exemplary user interface displaying an information card in response to user interaction, according to one aspect of the present disclosure.

FIG. 2 shows an exemplary user interface displaying an information card in response to user interaction. In FIG. 2, the user interface 200 is one that may be provided by a client device. The particular example illustrated shows a web browser and a web page providing information from a user's email account. Upon navigating to the web page, the client device may obtain the text content to be displayed, e.g., content of the web page, and may check the text content for matches with a set of key terms, e.g., words or phrases indicated by a server system or stored at the client device. As discussed above, each of the key terms has corresponding information in a database. A key term may refer to a particular entity, and the entity may have a particular information card template associated with it.

In FIG. 2, after navigating to the web page shown in the user interface 200, the system may determine that the phrase "Global Corporation" matches an entry in a list of key phrases. In response, the client device may annotate each instance 210 of this term in the user interface 200, shown here by bold and italic formatting and a box around the term. Other types of annotations that are simpler or more complicated may be additionally or alternatively used. Each instance of the key term may also be made interactive.

When the user 101 interacts with an instance 210 of the key term, the client device may generate and provide an information card 250 (e.g., enhanced information card 250) corresponding to an entity represented by the term. As illustrated, the interaction may be a mouse-over event where a cursor rests on or near the annotated term for at least a minimum amount of time. This interaction may trigger the client device to request an information card from a server system. The information card may include any of various types of information relating to the entity indicated by the key term, such as values from a database, statistics, metrics, visualizations, links to further information, quantitative or qualitative ratings related to the entity, and so on.

In some embodiments, to allow the client device to obtain the data for the information card, the server system may (1) map an identified key term indicated by the client device to a specific entity, (2) select an information card template corresponding to the specific entity or a type or classification of that entity, and (3) retrieve information from a database relating to the specific entity, according to the types of information specified by the selected information card template. The server system may then send the data for the information card to the client device for display. In some embodiments, this process is performed in substantially real time. For example, the server system may cache information about various entities so that the client device may obtain and display an information card less than a threshold amount of time after detecting the user interaction (e.g., 3 seconds, 1 second, 0.5 seconds, etc.).

In some embodiments, a browser extension or other software agent on a client device may cooperate with a server system to allow detection of appropriate contexts to make information cards available. As an example, first, a browser extension may make a REST API request to obtain the list of topic elements (e.g., keywords or other context identifiers) for one or more data sources. These may be obtained by the server from card metadata, such as by identifying attributes specified by card templates 124 and extracting values for the attributes from the underlying data set(s) used to generate cards. The topic elements may also be specified in other card definition data 125, in metadata repositories, caches, and so on. Second, the browser extension may cache the set of received topic elements. Third, the browser extension may monitor content of browsed pages to determine if content of the page matches any of the cached topic elements. When a match is found, the browser extension may highlight the matching term and/or make the element interactive. Fourth, the browser extension may detect user interaction with the highlighted term, such as a mouse cursor hovering over the highlighted term. Fifth, the browser extension may make a REST API call to get the data corresponding to the highlighted element from the source data set for the appropriate card matching the highlighted term. The server may provide the data, such as HTML data, that constitute the content for the card. Fifth, the extension may render and display the card based on the received data. In some embodiments, the card content may be preloaded on the client device in response to finding topic elements in a page, before a user 101 interacts with the highlighted term.

Figure 3:
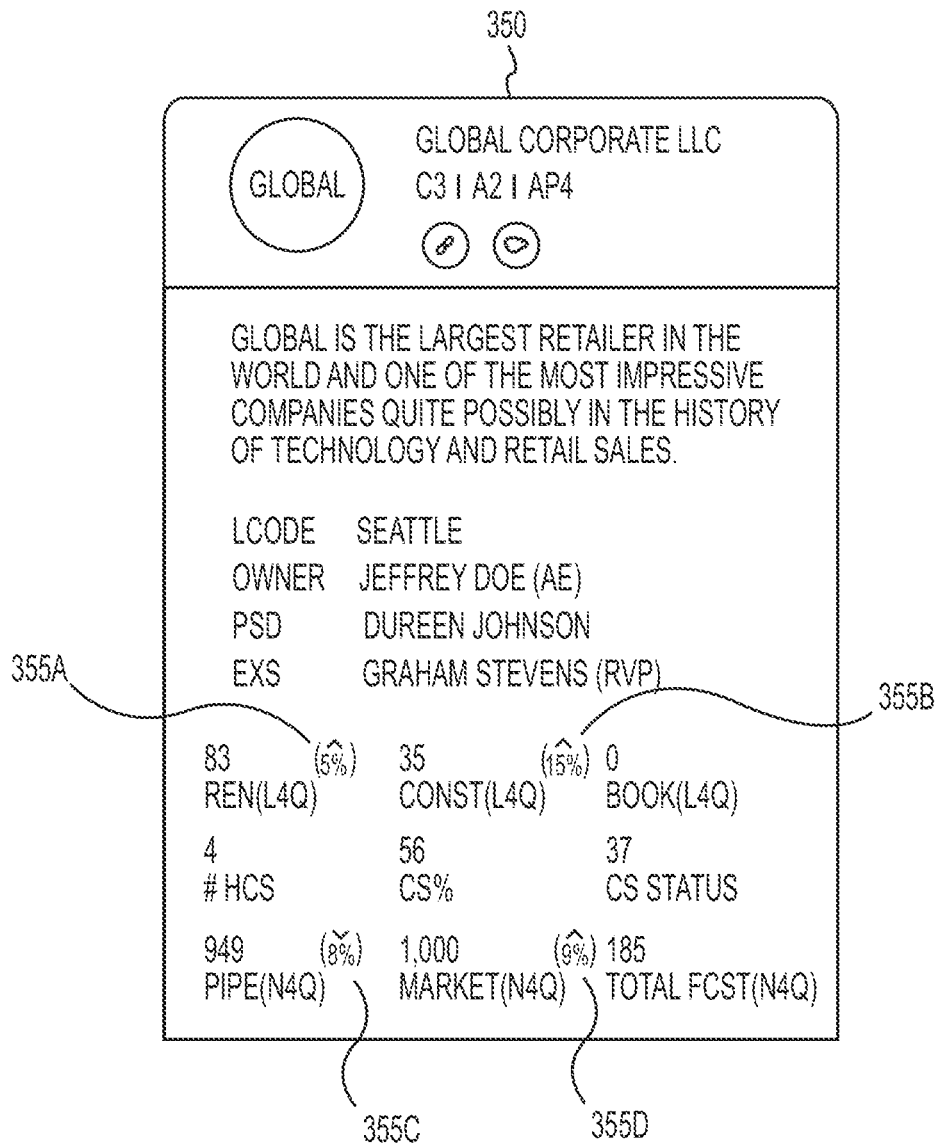
FIG. 3 shows an enhanced information card comprising exemplary dimensional views, according to one aspect of the present disclosure.

FIG. 3 shows an enhanced information card comprising exemplary dimensional views, according to one aspect of the present disclosure. In the example, the enhanced information card 350 presents information about a company or organization "Global Corporate LLC," including a brief description, a location, and key individuals associated with the company (e.g., Owner, PSD, EXS). The enhanced information card 350 may further present metrics associated with the company (e.g., key performance indicators) such as, for example, Ren (L4Q) (renewals in the last four quarters), Cons (L4Q) (consulting services in the last four quarters), Book (L4Q) (bookings in the last four quarters), #HCs (# of health checks in the past one year), CS % (customer satisfaction %), CS Status (customer satisfaction status), Pipe (N4Q) (sales pipeline in the next four quarters), Market (N4Q) (total marketing potential in the next four quarters), Total Fcst (N4Q) (total bookings forecast in the next four quarters), etc. for the company. It should be noted that metrics included in a card are not limited to the metrics explicitly discussed herein, and may include any relevant or desired metrics that can be derived from data stored in one or more data sources. As discussed above, various metrics may be selected by a card author (e.g., an administrator 131) to be included in the card, as defined by a corresponding card template 124 and/or card definition data 125.

With respect to one or more metrics, an administrator 131 may be allowed to select a dimensional view to display with the corresponding metric as supplementary information (i.e., context data), allowing a user 101 to gain a deeper or more useful understanding of the metric. In FIG. 3, the administrator 131 has selected a percent change (i.e., % change) dimensional view to be displayed with the metrics Ren (L4Q), Cons (L4Q), Pipe (N4Q), and Market (N4Q). A percent change dimensional view may show how much a current metric has changed from a past metric evaluated based on a predefined time or time period. The change may be represented by a percentage or other suitable values, ratios, etc. As alluded to above, the administrator 131 may select the time or time period to which the current metric is compared via a card creation user interface.

Upon a user 101 satisfying a trigger condition discussed above, an enhanced information card 350 may be generated and presented with the additional context data. For example, in FIG. 3, the enhanced information card 350 may include dimensional views 355A, 355B, 355C, and 355D associated with metrics Ren (L4Q), Cons (L4Q), Pipe (N4Q), and Market (N4Q), respectively. The dimensional view 355A shows that the Ren (L4Q) metric has increased by 5% from a predefined time or time period, by indicating the upward change with an arrowhead facing upward and the actual percentage value. Similarly, the dimensional views 355B and 355D also use the upward-facing arrowheads and percentage values to indicate the upward changes of the respective metrics. The dimensional view 355C shows that the Pipe (N4Q) metric has decreased by 8% from a predefined time or time period, by indicating the downward change with an arrowhead facing downward and the actual percentage value. The displayed arrowheads and percentage values may be color-coded to further aid the user 101 to quickly understand the context data. For example, the upward change may be color-coded in green and a downward change may be color-coded in red. The graphical user interface (GUI) elements such as arrowheads shown in FIG. 3, which may be used to indicate the changes and directions of the changes associated with the metrics, may be referred to herein as change indicators. Change indicators may not be limited to arrowheads and other GUI elements explicitly discussed in the present disclosure, and may include any suitable GUI elements that may help the user 101 understand the context data conveniently and promptly.

Figure 4A:
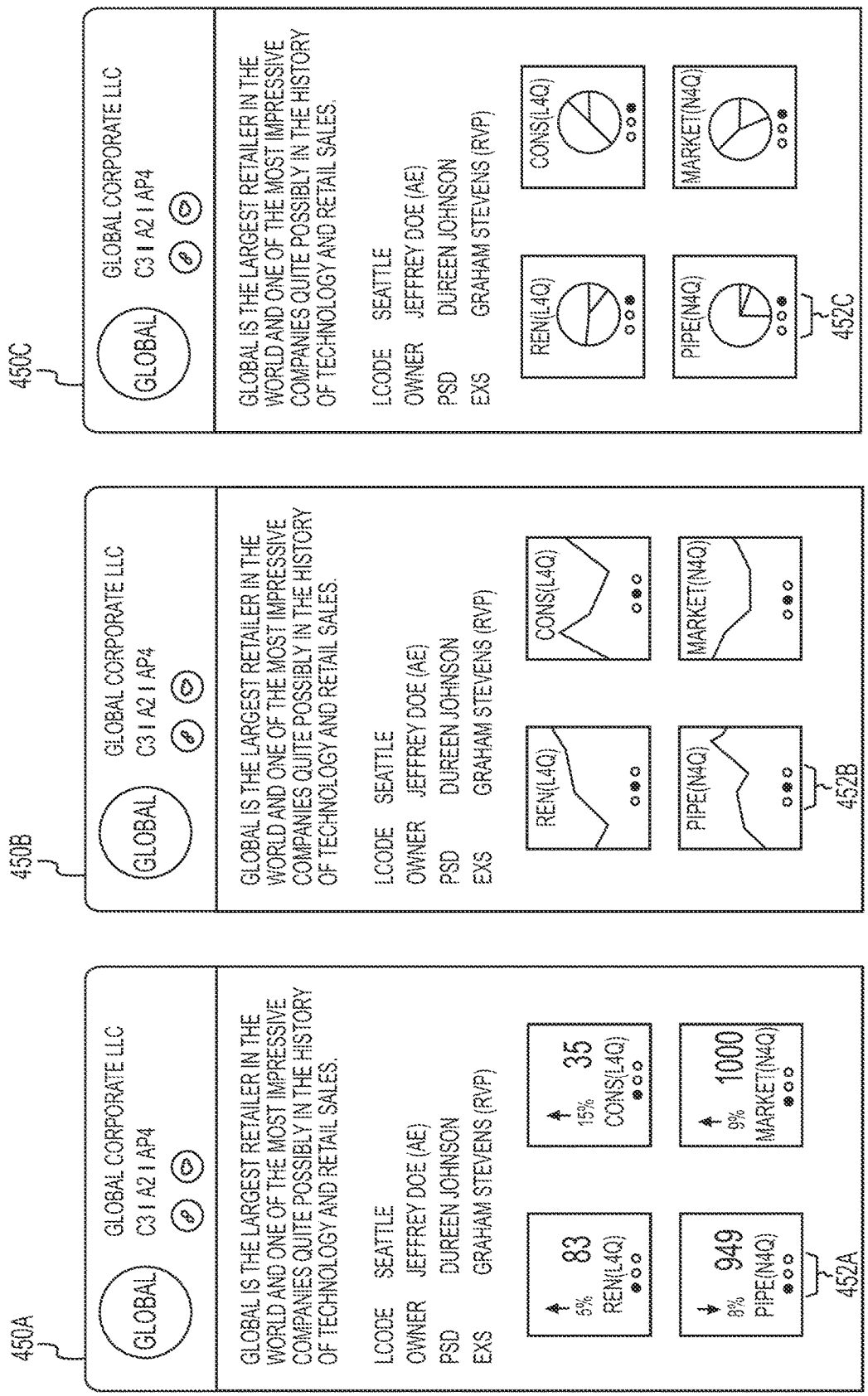
FIG. 4A shows a sequential view of an exemplary enhanced information card transitioning between different types of dimensional views, according to one aspect of the present disclosure.

FIG. 4A shows a sequential view of an exemplary enhanced information card transitioning between different types of dimensional views in synchronization, according to one aspect of the present disclosure. Particularly, FIG. 4A shows an enhanced information card displaying different types of dimensional views at different times. In FIG. 4A, the enhanced information card 450A depicts the enhanced information card displaying a first type of dimensional views at a first time, the enhanced information card 450B depicts the enhanced information card displaying a second type of dimensional views at a second time, and the enhanced information card 450C depicts the enhanced information card displaying a third type of dimensional views at a third time. The dimensional views displayed in each of the enhanced information cards 450A, 450B, and 450C may be in synchronization (i.e., in-sync), as the dimensional views displayed at one point in time are of the same type. For instance, the enhanced information card 450A at a first time may include percent change dimensional views associated with the metrics, the enhanced information card 450B at a second time may include trend line dimensional views associated with the metrics, and the enhanced information card 450C at a third time may include breakdown dimensional views associated with the metrics.

In one embodiment, the enhanced information card may periodically transition from 450A to 450B, from 450B to 450C, and from 450C to 450A iteratively and without user intervention, using a time-automated docked scrolling feature. The views may transition periodically based on a predefined transition time (i.e., predefined time interval), which an administrator 131 may configure via the card creation user interface. The transition between different types of dimensional views may be indicated using a scrollable dock placed at any suitable location within the information card. In FIG. 4A, such a dock is placed at the bottom of the region or grid containing the corresponding metric and dimensional view. A scrollable dock may comprise a plurality of dots or geometrical shapes, each being representative of an instance of a dimensional view among a plurality of dimensional views associated with the corresponding metric. For example, when the enhanced information card 450A displays a first type of dimensional views at a first time, the scrollable dock 452A may indicate that a first instance, among multiple instances of dimensional views associated with each metric, is being displayed by highlighting the dot at the leftmost position. Once the enhanced information card 450A transitions to the enhanced information card 450B at a second time, the scrollable dock 452B may indicate that a second instance of dimensional views is being displayed for each metric, by highlighting the dot at the center position. Once the enhanced information card 450B transitions to the enhanced information card 450C at a third time, the scrollable dock 452C may indicate that a third instance of dimensional views is being displayed for each metric, by highlighting the dot at the rightmost position.

Although FIG. 4A shows the same type of dimensional views being associated with the metrics in each of the enhanced information cards 450A, 450B, and 450C, different types of dimensional views may be associated with the metrics in each enhanced information card. For example, different types of dimensional views may be associated with the metrics in the enhanced information card 450A. To that end, an administrator 131 may be allowed to associate one or more dimensional views with each metric in an information card, and also configure the order by which the associated one or more dimensional views may be displayed for the corresponding metric. As alluded to above, the card author may also configure a transition time interval between the views (e.g., every 3 seconds, etc.). The transition interval may be configured individually for the dimensional views associated with each metric. In other words, dimensional views associated with one metric may have a transition interval of five seconds, while dimensional views associated with another metric in the same information card may have a transition interval of three seconds. However, as shown in FIG. 4A, the transition interval for the dimensional views may be configured to be the same with respect to all metrics contained in an information card. It should thus be noted that various parameters associated with transitioning dimensional views in an information card may be configurable, such that the information card may be customized in various ways in accordance with preferences and needs of the user 101 and/or the card author 131.

In an alternative embodiment, the transition between the dimensional views associated with a metric may not be automated, and may be manually triggered by a user 101. To that end, the scrollable dock may be interactive, and may allow the user 101 to move from one dimensional view to another by interacting with the scrollable dock. For example, the user 101 may transition from one dimensional view to another by placing a pointer or mouse cursor over a dot representative of another dimensional view. The transition may occur by merely placing the pointer or mouse cursor over the dot, clicking or tapping on the dot, placing the pointer or mouse cursor over the dot for a predetermined amount of time, etc. An administrator 131 may configure the transition mode to be automated or manual, as explained above. An administrator 131 may also configure the transition mode to be semi-automated. In the semi-automated transition mode, the transition may take place automatically at first, but the user 101 may be provided with an option to disable the automated transition. Upon the user 101 disabling the automated transition, the user 101 may interact with the scrollable dock to transition between dimensional views. In other words, the user 101 may be able to switch between the automated and manual transition modes.

Figure 4B:
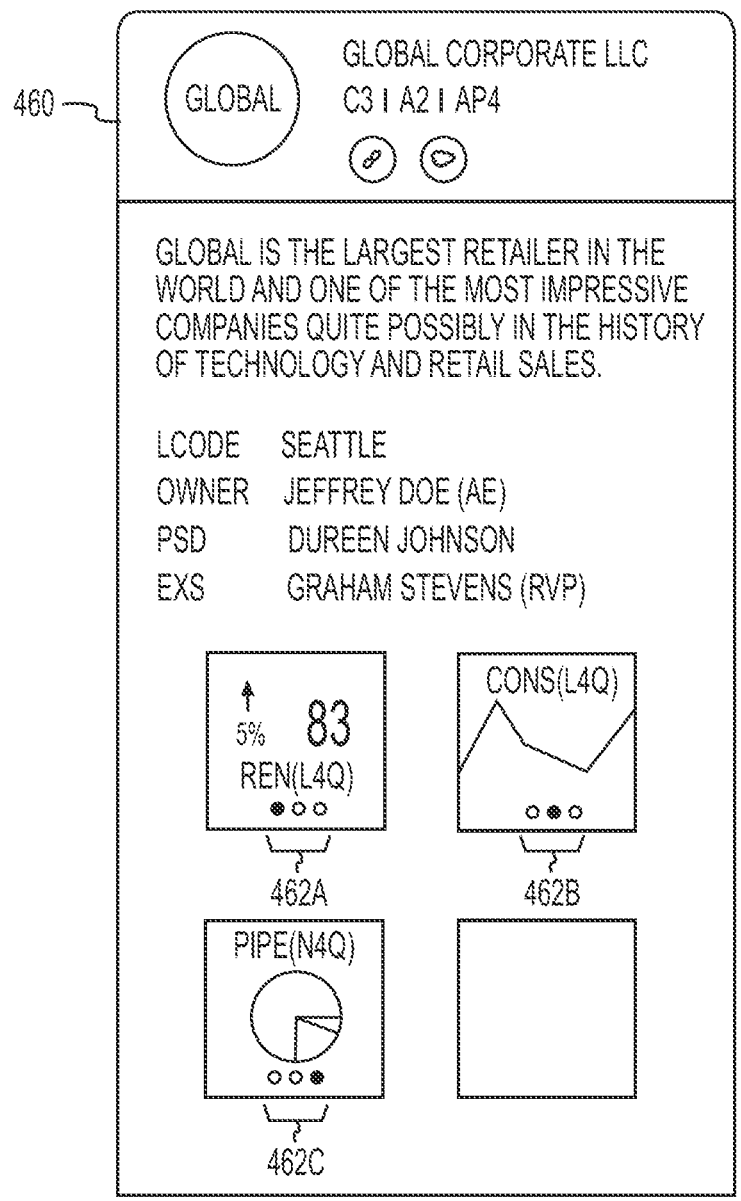
FIG. 4B shows an exemplary enhanced information card comprising different types of dimensional views at a specific time, according to one aspect of the present disclosure.

As an example, FIG. 4B shows an enhanced information card 460 comprising different types of dimensional views at a specific time. In contrast to each of the enhanced information cards 450A, 450B, and 450C in FIG. 4A, the enhanced information card 460 is configured such that the metrics may be associated with different types of dimensional views at a specific time. The dimensional views displayed on the enhanced information card 460 may thus be described as being out of synchronization (i.e., out-of-sync). Particularly, the Ren (L4Q) metric is associated with a percentage change dimensional view, which is represented by the leftmost dot in the scrollable dock 462A, the Cons (L4Q) metric is associated with a trend line dimensional view, which is represented by the center dot in the scrollable dock 462B, and the Pipe (N4Q) is associated with a breakdown dimensional view, which is represented by the rightmost dot in the scrollable dock 462C. As indicated by the number of dots in the scrollable dock, each metric in the information card 460 is associated with three dimensional views. A dimensional view can be transitioned to a different dimensional view automatically, manually, or semi-automatically as explained above.

Figure 4C:
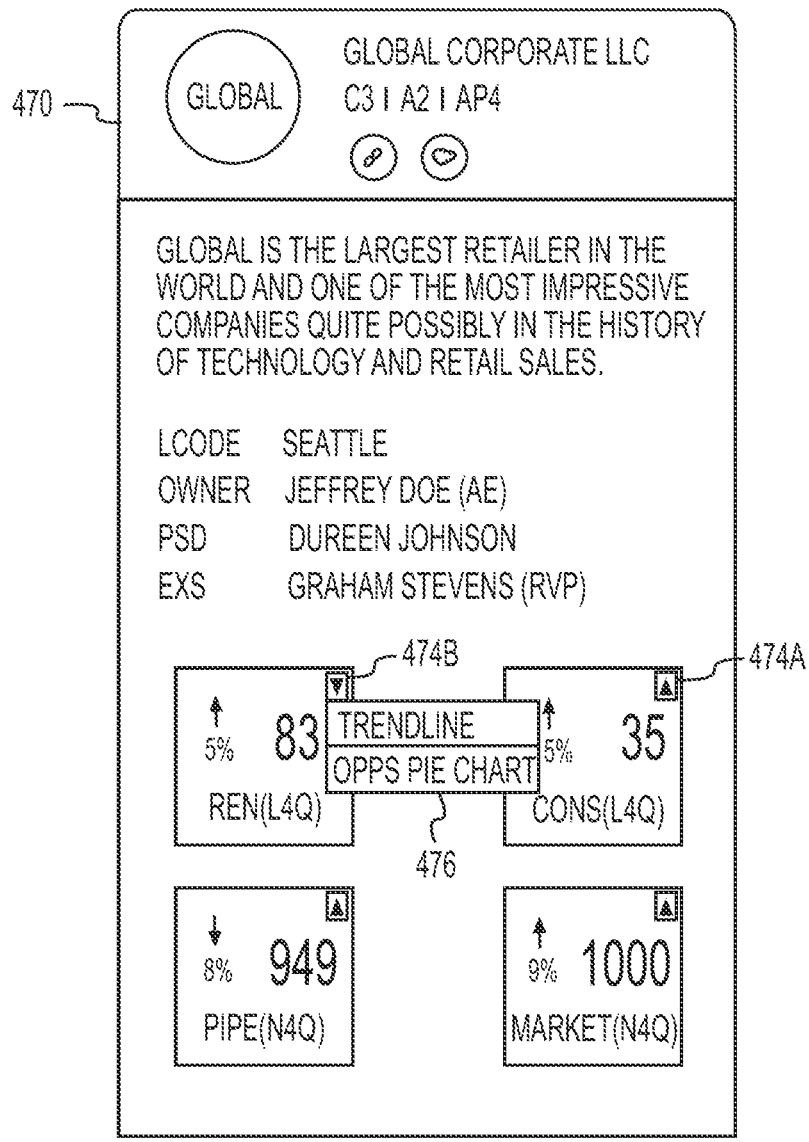
FIG. 4C shows an exemplary enhanced information card comprising a drop-down menu allowing a user to transition between different types of dimensional views, according to one aspect of the present disclosure.

As another example, FIG. 4C shows an enhanced information card 470 comprising a drop down menu 476 allowing a user 101 to switch between different types of dimensional views. In lieu of the scrollable dock illustrated in FIGS. 4A-4B, the drop down menu 476 listing other available dimensional views may be presented for user selection. The drop down menu 476 may be expanded by a user 101 interacting with a drop down menu button 474A. For example, the drop down menu button 474A may be activated upon a pointer or mouse cursor hovering over the button, the button being clicked or tapped, etc. Once the drop down menu button 474A has been activated, the button may change in appearance as shown by the activated drop down menu button 474B. For example, as shown in FIG. 4C, the activated drop down menu button 474B may be characterized by a triangular pointer placed upside down, while the "un-activated" drop down menu button 474A may be characterized by an upright triangular pointer. Upon the drop down menu button being activated, the drop down menu 476 may be expanded allowing the user 101 to select an alternate dimensional view.

Figure 5:
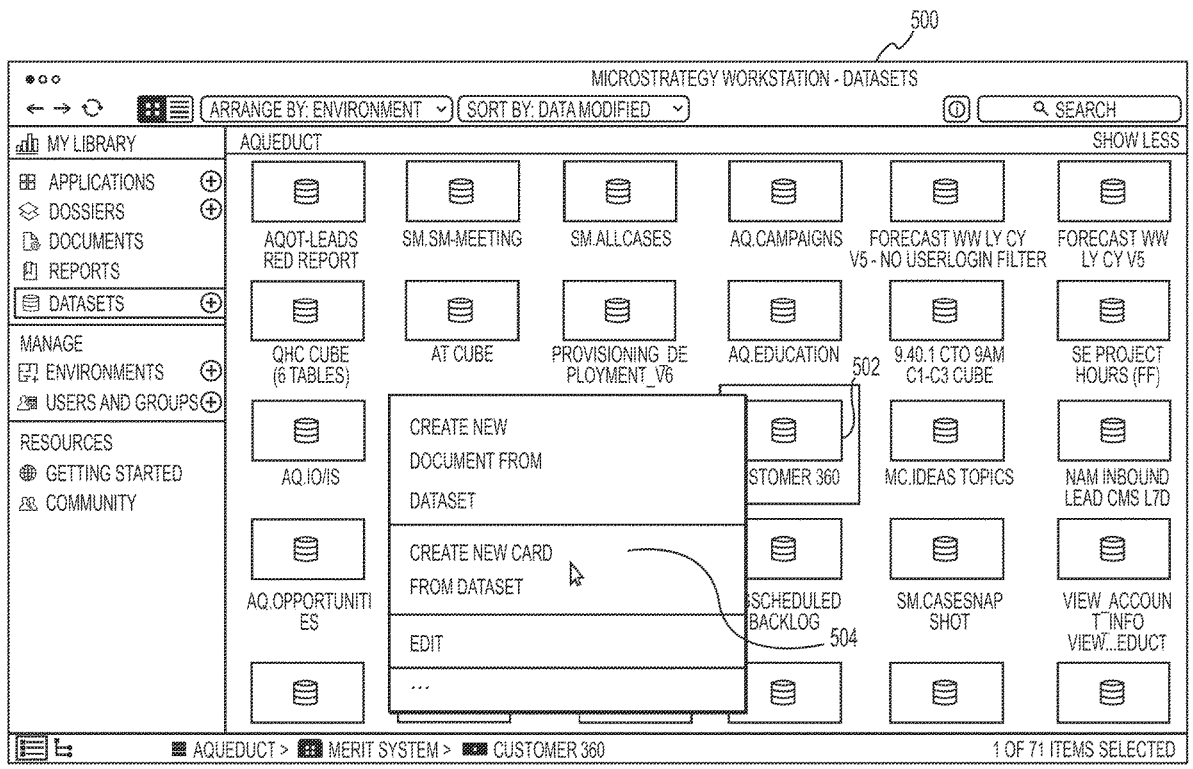
FIG. 5 shows an exemplary user interface that may be used to initiate creation of an information card from a data set, according to one aspect of the present disclosure.

FIG. 5 shows a user interface 500 of a client device, such as the administrator client device 130 from FIG. 1B, which may be used to initiate the creation of a new card from a data set. The user interface 500 shows various data sets that are available in an analytics platform.

The process of creating an information card may include an administrator 131 (i.e., a card author 131) importing, identifying, selecting, or otherwise accessing a dataset. This may be done through any interface or gateway of an analytics platform. As an example, an administrator 131 may create or access a data cube (e.g., an online analytical processing cube) or other data set. The administrator 131 may select the data set and interact with control to begin creating an information card from the cube. In some cases, this may be as simple as a "right-click" or hover over an icon representing the data set, and selecting an option for creating a card, such as an item "create a card" or "publish to extensions" from a context menu that appears. The indication that a card should be made may cause the system to provide a card creation user interface that shows properties of the data set, such as a list of attributes, metrics, entities, or other elements referenced in the data set.

In the example of FIG. 5, an administrator 131 may select one of the data sets, for example by right-clicking on an icon 502 for the data set, and in response the system may show a menu with various options. One of those options may be item 504, an option to create a new card from the data set. Selecting this option may cause the system to provide the card creation user interface shown in FIG. 6A.

Figure 6A:
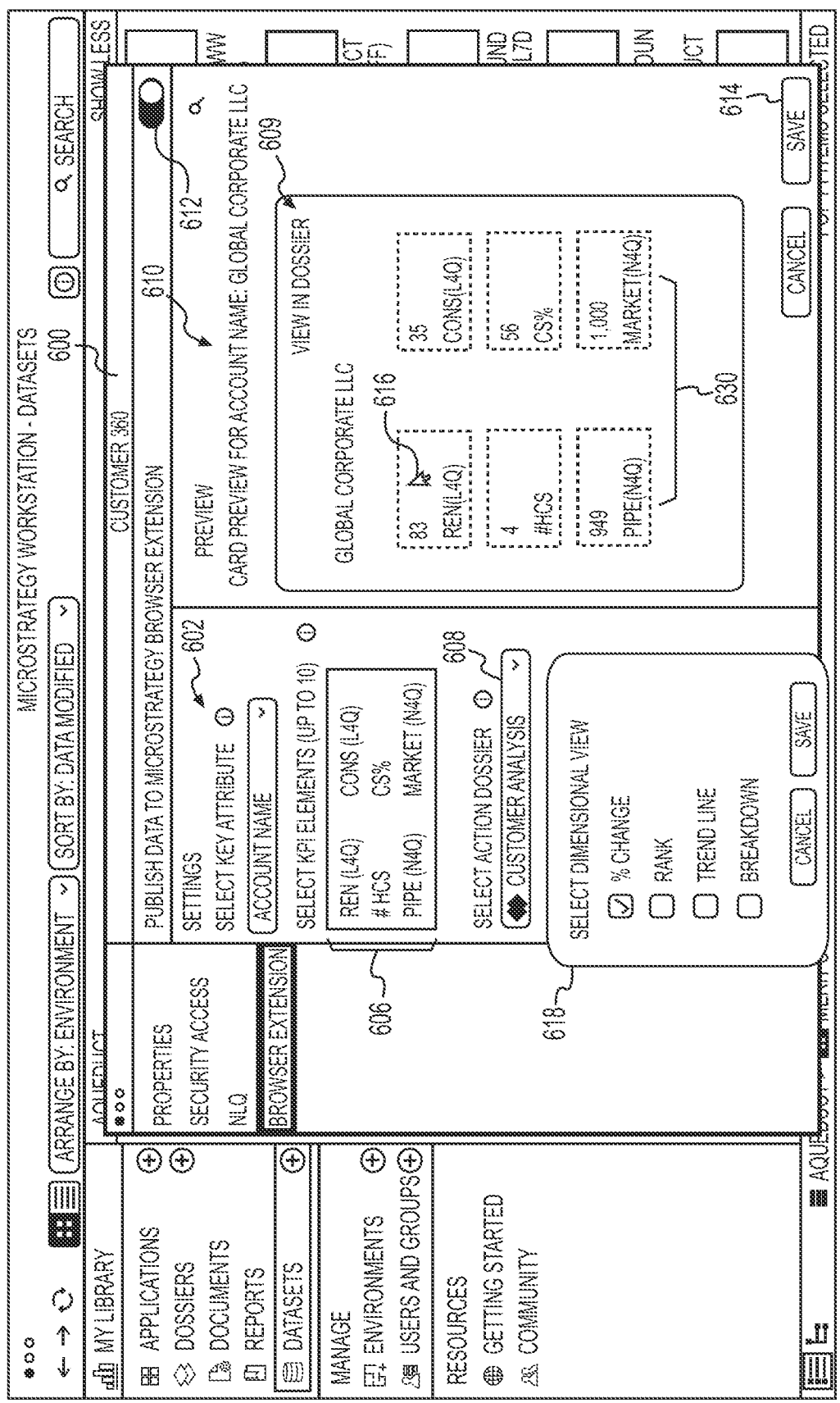
FIGS. 6A-6B show an exemplary card creation user interface that may be used to define the content and characteristics of an information card, according to one aspect of the present disclosure.
Figure 6B:
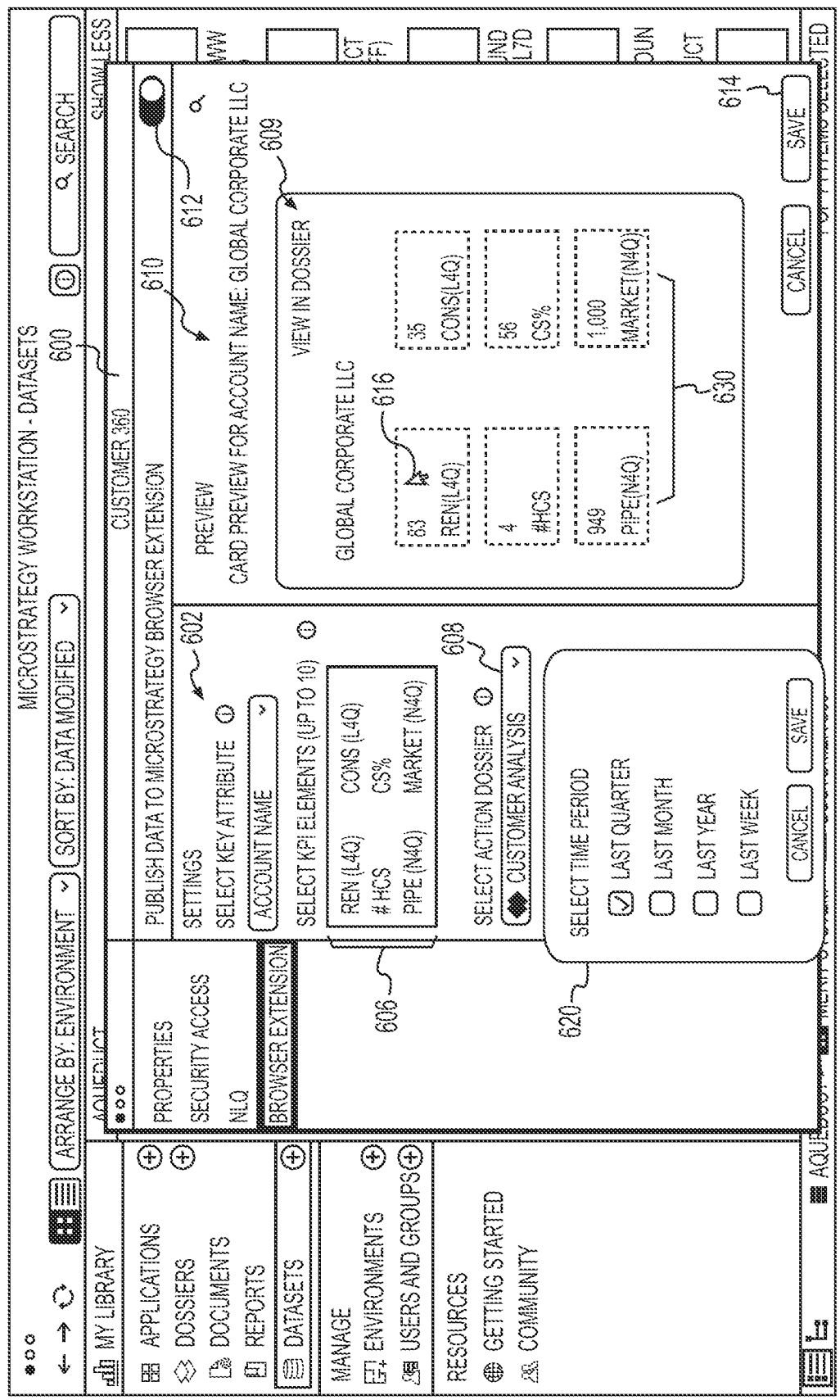

FIGS. 6A-6B show an exemplary card creation user interface 600 that allows the administrator 131 (i.e., a card author 131) to define the content and characteristics of an information card. Reference will be made to both FIG. 6A and FIG. 6B in the following description. The card creation user interface 600 may include a settings pane 602 showing elements of the data set, as well as a preview pane 610 that previews how the card will look, and may be used to place and organize elements to be displayed in the card.

The card creation user interface 600 may display data elements that are retrieved from the data set that may be used to define the card. Exemplary data elements are shown in a settings pane 602. The system may populate a set of data elements 606, e.g., attributes and/or metrics shown as "KPI Elements," automatically and/or based on selection by the administrator 131. Each data element 606 or key attribute may represent, for example, a column from a data cube or table. The relationship between any two columns used in an information card may be determined based on the data cube (i.e., may be enforced by the data cube). Data elements 606 may also represent the results of applying different functions or aggregations to a data set, e.g., computing a mean, maximum, minimum, or other measure based on the data set that the user selected in FIG. 5. The administrator 131 may select from the data elements 606 to add them to the card. For example, the administrator 131 may drag and drop the data elements 606 onto locations on a preview pane 610. In some embodiments, the administrator 131 may simply select desired data elements 606 and the system may automatically arrange them.

The settings pane 602 may include a control 608 that enables an administrator 131 to select a document to link to the card. The selected document may be indicated in the card, with a hyperlink or other control 609 that administrator 131 may select to open the selected document.

On the right hand side of the card creation user interface 600, the preview pane 610 shows a preview of the card being displayed based on the current selections and settings from the administrator 131. The preview pane 610 may allow the administrator 131 to see the effects of changes and selections in real time as parameters of the card are adjusted. As shown in FIG. 6A, each selected KPI element (e.g., metric) 630 that is displayed in the preview pane 610 may include a corresponding value as well as a label or name. For example, the KPI element in the upper left corner includes the label "Ren (L4Q)" and a value "83."

As explained above in reference to FIGS. 3 and 4A-4C, the card creation user interface 600 may allow an administrator 131 to supplement the card with context data. In one embodiment, the card creation user interface 600 may allow an administrator 131 to associate a KPI element with one or more dimensional views, or to include one or more dimensional views in connection with the KPI element. For example, when the system detects that the administrator 131 is interacting with a KPI element (e.g., Ren (L4Q)) shown on the preview pane 610, or in response to a KPI element being dragged and dropped onto the preview pane 610 by the administrator 131, the system may display a pop-up window 618 listing one or more dimensional view types available for selection. A dimensional view type available for one metric may not be available for another metric. The system will be able to determine which dimensional view type(s) can be associated with the KPI element selected by the administrator 131, based on data available in the data set that is related to the KPI element. For example, the system may make a preliminary determination on which dimensional view type(s) should be used by the administrator 131. The preliminary determination may be made using AI techniques, such as by using an AI model that has been trained using data available in the data set. Such an AI model may be configured to identify dimensional view type(s) that the administrator 131 should use in connection with a selected KPI element. The identified dimensional view type(s) may be presented to the administrator 131 for selection. User interaction with a KPI element may be detected when a mouse cursor or pointer 616 of the administrator 131 hovers over a region/field containing the KPI element, the administrator 131 clicks or taps on the region/field containing the KPI element, etc.

In some embodiments, the system may retain a mapping between metric types and attributes, and corresponding back-end analytical functions. Based on the mapping, appropriate dimensional view type(s) may be recommended to the administrator 131 upon the administrator's selection of a KPI element. For example, a KPI element related to sales, which may be associated with a time attribute, may be displayed as a time-based dimensional view such as, e.g., a trend line, a percent change, etc. Therefore, dimensional view type(s) associated with the time attribute may be recommended to the administrator 131 for selection. On the other hand, if a selected KPI element is not associated with a time attribute (i.e., if a selected KPI element is associated with a non-time attribute), dimensional view type(s) associated with the non-time attribute may be recommended to the administrator 131 (e.g., a rank, a breakdown, etc.).

The pop-up window 618 may list one or more dimensional view types available for the selected KPI element. In some embodiments, the dimensional view types may be displayed with corresponding check boxes or any other suitable GUI elements that allow the administrator 131 to select one or more dimensional view types. For example, instead of including check boxes near selectable dimensional view types, the administrator 131 may be allowed to drag and drop a dimensional view onto a region/field containing the desired KPI element. The dimensional view types may include a percent change, a rank, a trend line, a breakdown, and so on. It should be noted that the dimensional views are not limited to the types explicitly discussed in the present disclosure, and may include any suitable representations of the contexts underlying the corresponding metrics.

In FIG. 6A, the administrator 131 has selected a percent change dimensional view type, indicated by the checked box next to the dimensional view type "% Change." However, the administrator 131 can associate multiple dimensional view types with a KPI element, in order to display multiple dimensional views in connection with the KPI element using the automated, manual, or semi-automated scrolling feature discussed above in reference to FIGS. 4A-4C. In other words, more than one dimensional view type can be selected by the administrator 131 per KPI element.

Upon the administrator 131 selecting one or more dimensional view types to be associated with a KPI element, the card creation user interface 600 may display one or more pop-up windows, each pop-up window listing attributes associated with the corresponding dimensional view type. For example, upon an administrator 131 selecting the percent change dimensional view type and indicating that the selection process has been completed by, for example, pressing the button "SAVE" in FIG. 6A, a pop-up window 620 listing attributes associated with the percent change dimensional view type may be presented to the administrator 131 as shown in FIG. 6B.

For example, attributes associated with the percent change dimensional view type may include time attributes such as last quarter, last month, last year, last week, etc. The percent change dimensional view type may be associated with time attributes as the dimensional view may require comparison of the metric calculated for the current time period to another metric calculated for a previous time period. The previous time period may be determined based on selection of one of the time attributes presented to the administrator 131 via the pop-up window 620. As another example, attributes associated with the rank dimensional view type may include non-time attributes such as, for example, state, region, country, etc. The rank dimensional view type may be associated with non-time attributes such as, for example, attributes indicating geographical regions/boundaries, as the dimensional view may require comparison of the metric calculated for an entity (e.g., Global Corporate LLC.) with those calculated for one or more other entities in a particular geographical region. Based on the metrics calculated for the entity associated with the card and other entities, the entity may be ranked and the ranking information may be displayed as a dimensional view in connection with the corresponding KPI element. The system may use AI techniques, such as machine learning algorithms, to automatically determine attributes related to a selected dimensional view type. Fact tables and attribute hierarchies may be used to train and/or build an AI model, and the attribute determination may be performed using the AI model. The determined attribute(s) may be presented to the administrator 131 for selection.

When multiple dimensional view types are selected for a KPI element, the administrator 131 may be presented with a pop-up window or other suitable menu listing the automated, manual, or semi-automated scrolling features to choose from. If the automated or semi-automated scrolling feature is selected, the administrator 131 may be presented with another pop-up window or menu listing a plurality of time intervals for selection. When an enhanced information card comprising multiple dimensional views is displayed to a user 101 upon detecting a trigger condition, the automated or semi-automated scrolling feature may be activated based on a selected time interval. For example, the multiple dimensional views generated in connection with a corresponding KPI element may be sequentially displayed one after another, based on the selected time interval.

In some embodiments, the features that may be configurable by an administrator 131 via a card creation user interface as explained above in reference to FIGS. 4A-4C and 6A-6B may also be configurable by a user 101 that is presented with the card. In other words, an enhanced information card, when generated and displayed in a user interface, may include one or more menus that enable a user 101 to configure various parameters for linking dimensional views with metrics and customizing the display of the dimensional views. Therefore, instead of allowing only an administrator 131 to configure an enhanced information card (and dimensional views thereon) to be rendered and displayed in a certain manner, the system may also allow a user 101 to set those configurations based on his/her preferences or needs on an ad-hoc basis. To that end, the administrator 131 may configure the enhanced information card to present one or more menus, or the system may automatically configure the enhanced information card to present one or more menus, by which the user 101 viewing the enhanced information card may configure and customize various features of the card in a user-preferred manner.

Figure 7:
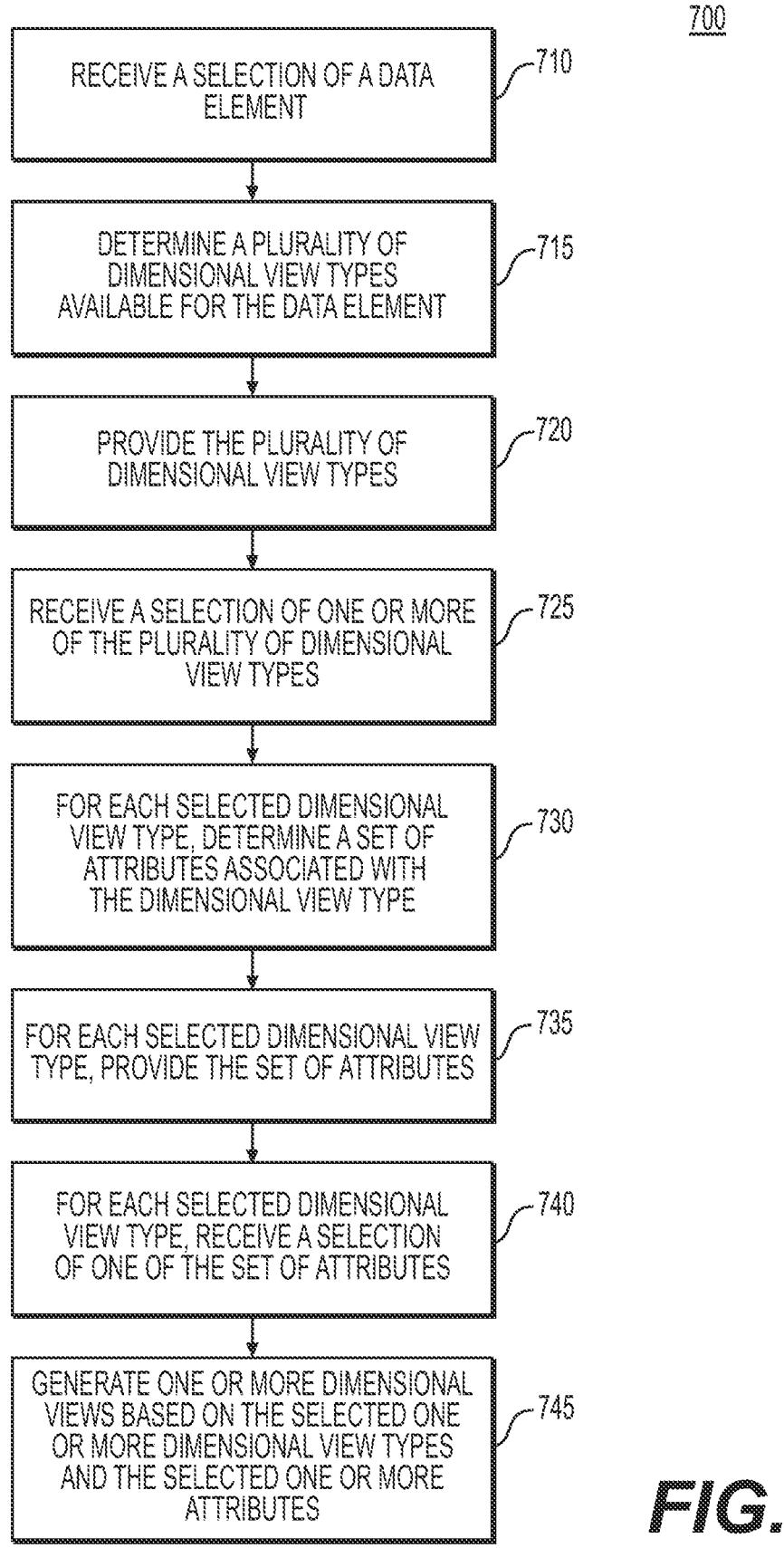
FIG. 7 is a flowchart illustrating an exemplary method of generating context data for an information card, according to one aspect of the present disclosure.

FIG. 7 is a flowchart illustrating an exemplary method of generating context data for an information card, according to one aspect of the present disclosure. More particularly, method 700 relates to generating one or more dimensional views for a data element (e.g., KPI element) included in an information card. At step 710, the system may receive a selection of a data element to be included in an information card via, for example, a card creation user interface 600 or other user interface. At step 715, the system may determine a plurality of dimensional view types available or recommended for the data element. As explained above, step 715 may be performed by the system using AI techniques. In some embodiments, step 715 may be performed upon detecting user interaction with the data element such as, for example, a mouse cursor or pointer hovering over a field/region containing the data element, clicking or tapping on the field/region containing the data element, etc. At step 720, the system may provide the determined plurality of dimensional view types to an administrator 131 or user 101. As explained above, the dimensional view types may be provided using a pop-up window, a menu, or other suitable GUI element that lists the dimensional view types. At step 725, the system may receive a selection of one or more dimensional view types, among the plurality of dimensional view types.

At step 730, the system may determine, for each selected dimensional view type, a set of attributes associated with the dimensional view type. The attributes associated with a particular dimensional view type may be determined using an AI model. At step 735, the system may provide the set of attributes determined for each selected dimensional view type to the administrator 131 or user 101. The attributes may be provided using a pop-up window, a menu, or other suitable GUI element that lists the attributes. At step 740, the system may receive, for each selected dimensional view type, a selection of an attribute among the set of attributes associated with the dimensional view type. At step 745, the system may generate one or more dimensional views based on the selected one or more dimensional view types and the selected one or more attributes that correspond respectively to the one or more dimensional views.

Additionally, when more than one dimensional view type is selected for a data element, the system may provide a plurality of display options (e.g., automated, manual, and semi-automated scrolling) for user selection. If the administrator 131 or user 101 selects the automated or semi-automated scrolling option, the system may also ask the administrator 131 or user 101 to specify a time interval. The administrator 131 or user 101 may specify the time interval by inputting a numerical value and a unit of time, or by selecting from a plurality of time intervals provided by the system. Based on the selected time interval, the dimensional views may be displayed sequentially one after another based on the time interval, when the information card is presented to a user 101. The time interval selection may not be required when the manual scrolling option is selected. In this case, the dimensional view may be displayed with an interactive scrolling dock or other suitable GUI element that enables the user 101 to manually select a dimensional view to display among multiple dimensional views.

With renewed reference to FIGS. 6A-6B, after the card authoring process is completed, the administrator 131 may select a control 614 to save the card. From the selections on the interface 600, the system will save the card information to allow multiple cards that may be presented—not just a single card for the "Global Corporate LLC" account, but a displayable card element for each unique value in the data set for the "Account Name" key attribute. As a result, if there are 20 accounts in the data set, saving the card format may allow the defined type of card to be displayed for any and all of the 20 different accounts. Additional interfaces may be provided if desired to customize or adjust individual cards in addition to or instead of adjusting cards as a group.

To facilitate card generation, the system may make available standardized templates that an administrator 131 may select to apply predetermined combinations of layout and formatting attributes. For example, a template may provide a three-by-three grid of containers, each configured to provide a metric or attribute (i.e., KPI element), so the administrator 131 may add 9 different data elements. As another example, as shown in FIGS. 6A-6B, a template may provide a two-by-three grid of containers. The template may also include other elements such as a header region, a footer region, a title, etc. which may also be populated and customized. The interface may include also controls allowing an administrator 131 to set or adjust layout and formatting. The interface may enable an administrator 131 to select elements of the data set and assign positions for the selected data elements to be displayed. For example, the interface may enable an administrator 131 to drag data set elements (e.g., attributes, metrics, etc.) and drop the elements into specific fields/regions in a card template. Doing so may create links between the card and specific portions or elements of the data set, which may be used in an ongoing manner to refresh the content of the card from the current values in the data set.

When adding an element from the data set, the system may automatically configure properties of the card based on the characteristics of the data set. For example, when an administrator 131 drags an attribute from a data set to a region of the card template, the system may identify a data type for the attribute value (e.g., text, integer, unit of time, dollar amount, geographical location, etc.) and apply formatting for that data type. The system may also look up a human-readable name or explanation for the attribute type, e.g., determining and adding to the card a "Number of Employees:" descriptor for the attribute value if the attribute represents a number of employees. In addition, the system may identify a record or portion of the data set representing that attribute. If the card being generated is for a specific company and the attribute is number of employees, for example, the system may identify and store, in card definition data, a field or set of records used to determine the value of the attribute from the data set for that specific company. In general, the card generation process creates mappings between elements of the card (e.g., portions of the card, or fields/regions of a card template) with portions of the data set.

In some embodiments, each information card may be created individually. For example, the process of creating cards may be done for each individual entity, e.g., a first card is created for "Company 1" with a first, custom subset of attributes and metrics included in the card; a second card is created for "Company 2," with second, different custom subset of attributes included in the card; and so on.

In some embodiments, cards may be generated in groups or batches, for example, linked to a master card definition or card template that specifies card content types and not only general formatting and layout. This may speed the process of creating cards and may increase efficiency. For example, the system may create one generic entity type card for object type "employee." This entity type card may be used to provide card presentations for all objects of the "employee" type, with the card presentation for a specific employee having card content and metadata (e.g., keywords for triggering) populated from the attribute values for the specific employee.

The information cards may include embedded rules or conditions that may vary the content or presentation of the cards based on different conditions. For example, the inclusion of certain content or the formatting of content may be conditional. Thresholds may be set for an attribute or metric, and if the value meets predetermined criteria (e.g., inside or outside of a certain range), that attribute may be highlighted or otherwise emphasized. Rules or conditions defined for a card may also be used to personalize the card for different types of end users. For example, the rules may specify that one attribute is shown for users in one department and a different attribute is shown instead for users in a second department.

The system may use artificial intelligence or machine learning to automatically generate cards or to suggest content for cards. In some cases, the system may predictively suggest cards to be generated and content for the cards (e.g., subsets of attributes and metrics that are most commonly used). For example, the system may access usage data indicating, for example, rates of co-occurrence of different terms in documents of an organization, query histories from users of the organization, counts of interactions with different elements of documents, time spent viewing or interacting with different documents, and so on. From this usage data, the system may infer which entities referenced in a data set are most significantly as well as which attributes and metrics are most often used with those entities or entities of the same types. The system may then recommend the creation of cards for the identified entities, and may recommend that the most commonly used attributes and metrics be presented in the cards. As users view cards and interact with the cards, the system may record further usage information, which the system may use to alter the content of cards and to provide better recommendations in the future.

Embodiments of the present disclosure and all of the functional operations described in this specification can be implemented in digital electronic circuitry, or in computer software, firmware, or hardware, including the structures disclosed in this specification and their structural equivalents, or in combinations of one or more of them. Embodiments of the present disclosure can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as descriptions of features specific to particular embodiments of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

What is claimed is:

1. A computer-implemented method of generating context data for an information card, the method comprising:
   receiving a selection of a data element to include in an information card relating to a particular entity, wherein the information card is configured for display based on a detection of a keyword associated with the particular entity;
   determining a plurality of data analysis types available for the data element;
   providing the plurality of data analysis types to an artificial intelligence machine learning model, wherein the artificial intelligence machine learning model is trained using previous data analysis type selections;
   receiving, from the artificial intelligence machine learning model, a machine learning output comprising a first data analysis type, from the plurality of data analysis types;
   determining a first set of attributes associated with the first data analysis type;
   providing the first set of attributes;
   receiving a selection of a first attribute from the first set of attributes; and
   generating a first data analysis based on the selection of the first data analysis type and first attribute.

2. The computer-implemented method of claim 1, wherein the machine learning output comprises a second data analysis type and further comprising:
   determining a second set of attributes associated with the second data analysis type;
   providing the second set of attributes;

receiving a selection of a second attribute from the second set of attributes; and generating a second data analysis based on the selection of the second data analysis type and second attribute.

3. The computer-implemented method of claim 2, wherein the first data analysis and the second data analysis is configured for display using a time-automated scrolling dock.

4. The computer-implemented method of claim 1, further comprising causing for display the first data analysis, within the information card.

5. The computer-implemented method of claim 1, further comprising detecting user interaction with the data element, wherein the plurality of data analysis types available for the data element are determined upon detecting the user interaction with the data element.

6. The computer-implemented method of claim 1, wherein the first set of attributes are provided in a card creation user interface.

7. The computer-implemented method of claim 6, wherein the first set of attributes are provided in a card presentation user interface, the card presentation user interface being generated based on the card creation user interface.

8. The computer-implemented method of claim 1, wherein the plurality of data analysis types comprise more than one of a percent change, a rank, a trend line, or a breakdown.

9. The computer-implemented method of claim 1, wherein the first set of attributes comprise one of: time attributes or non-time attributes.

10. The computer-implemented method of claim 1, wherein the first data analysis type and first attribute are stored as part of card data defining the information card, and the first data analysis is generated based on the card data.

11. The computer-implemented method of claim 1, further comprising:
   providing a plurality of time intervals;
   receiving a selection of a time interval from the plurality of time intervals; and
   sequentially displaying the first data analysis based on the time interval.

12. A computer-implemented method of generating context data for an information card, the method comprising:
   receiving a selection of a data element to include in an information card relating to a particular entity, wherein the information card is configured for display based on a detection of a keyword associated with the particular entity;
   determining a plurality of data analysis types available for the data element;
   providing the plurality of data analysis types;
   receiving a selection of a first data analysis type, from the plurality of data analysis types;
   determining a first set of attributes associated with the first data analysis type;
   providing the first set of attributes;
   receiving a selection of a first attribute from the first set of attributes; and
   generating a first data analysis based on the selection of the first data analysis type and first attribute.

13. The computer-implemented method of claim 12, further comprising:
   receiving a selection of a second data analysis type, from the plurality of data analysis types;
   determining a second set of attributes associated with the second data analysis type;
   providing the second set of attributes;
   receiving a selection of a second attribute from the second set of attributes; and
   generating a second data analysis based on the selection of the second data analysis type and second attribute.

14. The computer-implemented method of claim 13, further comprising:
   providing a plurality of time intervals;
   receiving a selection of a time interval from the plurality of time intervals; and
   sequentially displaying the first data analysis and the second data analysis based on the time interval.

15. The computer-implemented method of claim 12, wherein the first data analysis type and first attribute are stored as part of card data defining the information card, and the first data analysis is generated based on the card data.

16. The computer-implemented method of claim 12, wherein the first set of attributes associated with the first data analysis type are determined using a machine learning model.

17. The computer-implemented method of claim 12, wherein the plurality of data analysis types and the first set of attributes are provided in one of: a card creation user interface or a card presentation user interface.

18. The computer-implemented method of claim 12, wherein the plurality of data analysis types comprise more than one of: a percent change, a rank, a trend line, and a breakdown.

19. A system comprising:
   one or more processors; and
   one or more computer-readable media comprising instructions that, when executed by the one or more processors, cause the one or more processors to perform operations for generating context data for an information card, the operations comprising:
   receiving a selection of a data element to include in an information card relating to a particular entity, wherein the information card is configured for display based on detection of a keyword associated with the particular entity;
   determining a plurality of data analysis types available for the data element;
   providing the plurality of data analysis types;
   receiving a selection of a first data analysis type, from the plurality of data analysis types;
   determining a first set of attributes associated with the first data analysis type;
   providing the first set of attributes;
   receiving a selection of a first attribute from the first set of attributes; and
   generating a first data analysis based on the selection of the first data analysis type and first attribute.

20. The system of claim 19, wherein the operations further comprise:
   receiving a selection of a second data analysis type, from the plurality of data analysis types;
   determining a second set of attributes associated with the second data analysis type;
   providing the second set of attributes;
   receiving a selection of a second attribute from the second set of attributes; and
   generating a second data analysis based on the selection of the second data analysis type and second attribute, wherein the first data analysis and the second data analysis is configured for display within the information card.

* * * * *

UNITED STATES PATENT AND TRADEMARK OFFICE
CERTIFICATE OF CORRECTION

| | |
|---|---|
| PATENT NO. | : 11,989,175 B2 |
| APPLICATION NO. | : 17/935201 |
| DATED | : May 21, 2024 |
| INVENTOR(S) | : Scott Rigney et al. |

It is certified that error appears in the above-identified patent and that said Letters Patent is hereby corrected as shown below:

In the Claims

In Claim 19, in Column 26, Lines 38-39, delete "based on detection" and insert -- based on a detection --.

Signed and Sealed this
Ninth Day of July, 2024

Katherine Kelly Vidal
*Director of the United States Patent and Trademark Office*